April 14, 1959     E. A. HOBART ET AL     2,882,478
METHOD AND APPARATUS FOR WELDING
Filed Nov. 3, 1954     6 Sheets-Sheet 1
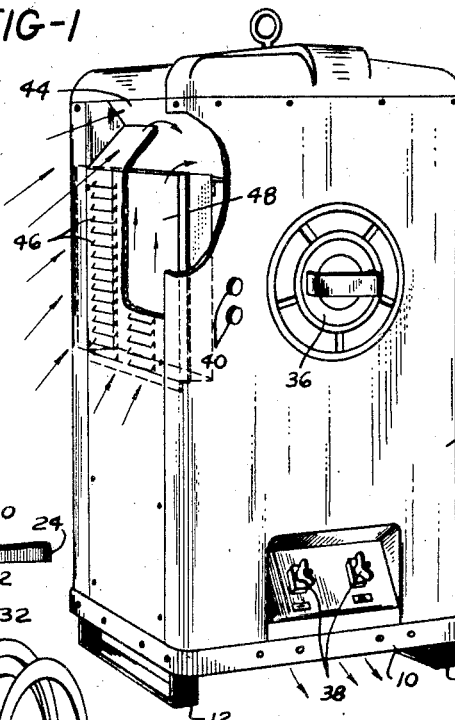
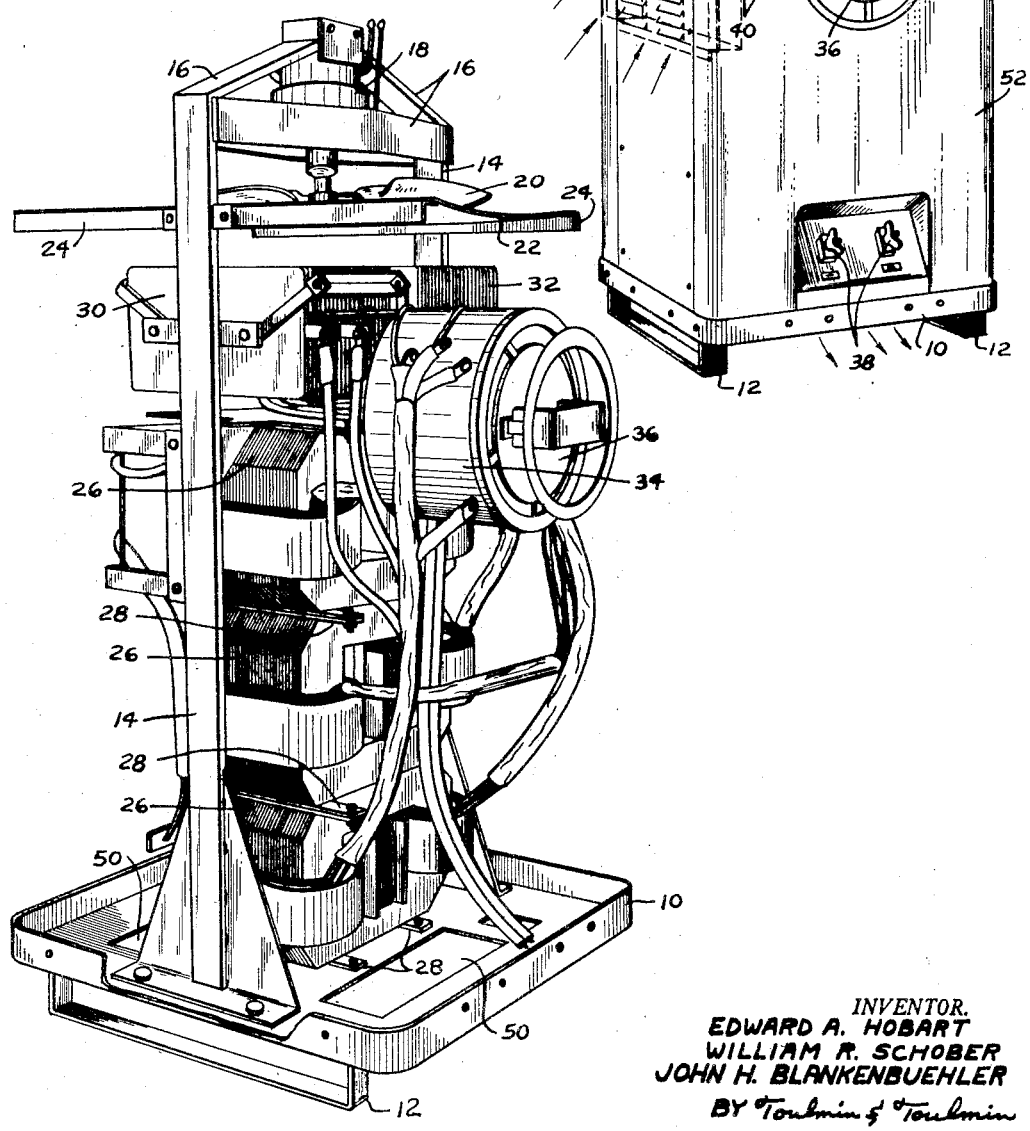
INVENTOR.
EDWARD A. HOBART
WILLIAM R. SCHOBER
JOHN H. BLANKENBUEHLER
BY Toulmin & Toulmin
ATTORNEYS April 14, 1959   E. A. HOBART ET AL   2,882,478
METHOD AND APPARATUS FOR WELDING
Filed Nov. 3, 1954   6 Sheets-Sheet 2

INVENTOR.
EDWARD A. HOBART
WILLIAM R. SCHOBER
JOHN H. BLANKENBUELER
BY Toulmin & Toulmin
ATTORNEYS

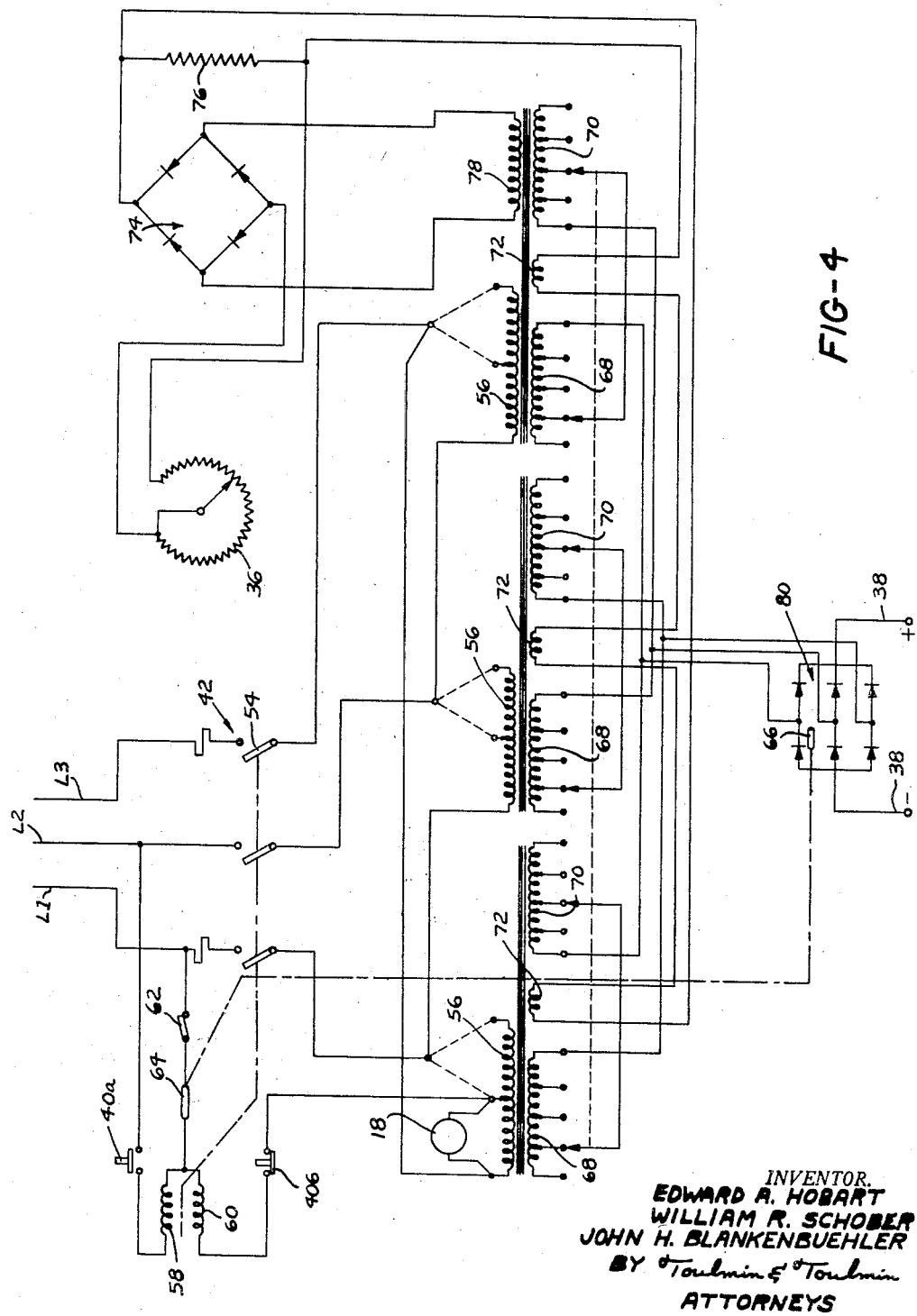

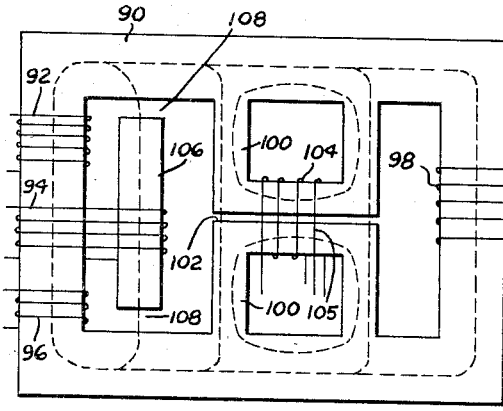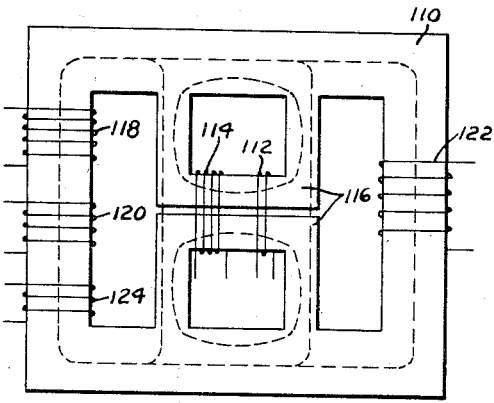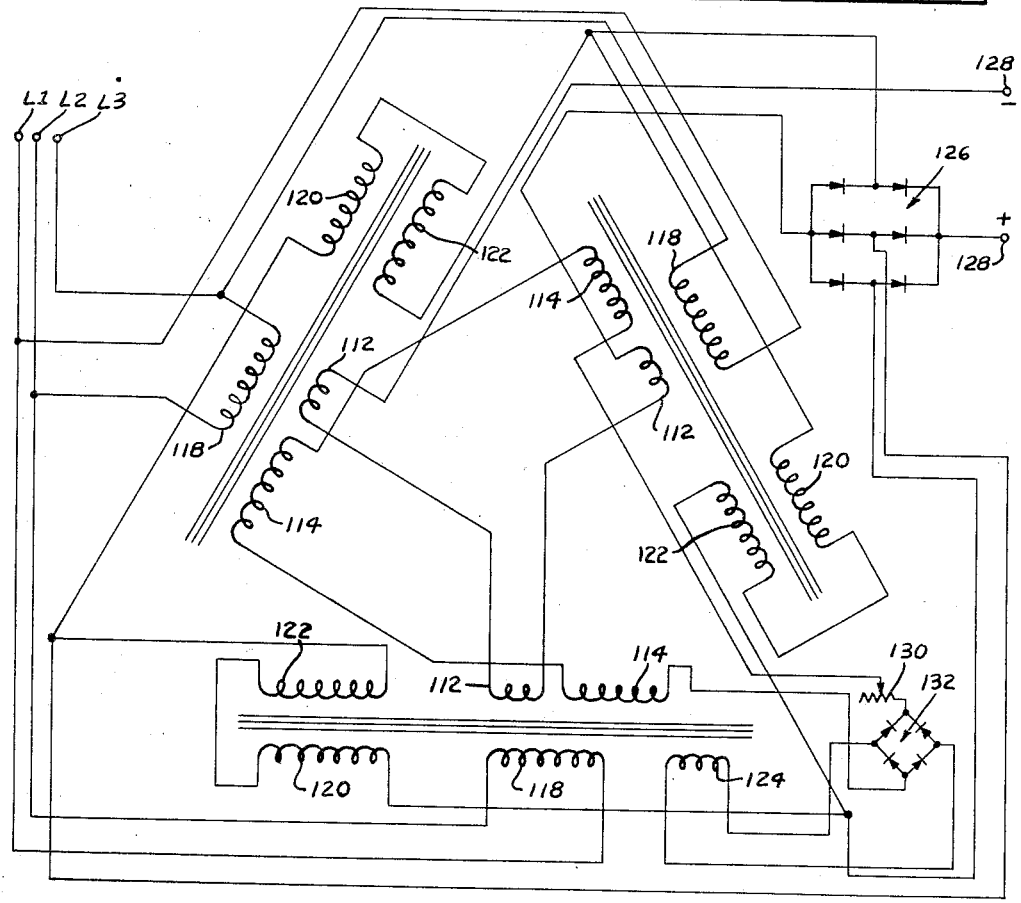

April 14, 1959　　　E. A. HOBART ET AL　　　2,882,478
METHOD AND APPARATUS FOR WELDING
Filed Nov. 3, 1954　　　　　　　　　　　　6 Sheets-Sheet 5

INVENTOR.
EDWARD A. HOBART
WILLIAM R. SCHOBER
JOHN H. BLANKENBUEHLER
BY Toulmin & Toulmin
ATTORNEYS April 14, 1959

E. A. HOBART ET AL 2,882,478

METHOD AND APPARATUS FOR WELDING

Filed Nov. 3, 1954

INVENTOR.
EDWARD A. HOBART
WILLIAM R. SCHOBER
JOHN H. BLANKENBUEHLER

BY Toulmin & Toulmin
ATTORNEYS

United States Patent Office 2,882,478
Patented Apr. 14, 1959

2,882,478

METHOD AND APPARATUS FOR WELDING

Edward A. Hobart, William R. Schober, and John H. Blankenbuehler, Troy, Ohio, assignors to The Hobart Brothers Company, Troy, Ohio, a corporation of Ohio Application November 3, 1954, Serial No. 466,622

21 Claims. (Cl. 321—25)

This invention relates to a method and apparatus for welding, and in particular to an alternating current welding transformer arrangement and a method of operation thereof.

In our co-pending application, Serial No. 400,038, filed December 23, 1953, now Patent No. 2,802,981, there was illustrated a single phase welding transformer characterized in an arrangement for effecting control of the welding current through a saturable reactor means associated directly with the transformer core.

The present invention represents a still further advance in the art of constructing and operating alternating current welding transformers having associated therewith saturable reactor means.

Single phase welding transformers are widely used in the art, but for heavy welding jobs, or for continuous operating welders, or for automatic equipment, it is preferable to distribute the load over the several phases of the supply line thereby obtaining more balanced conditions and, thus, more efficient loading of the power lines.

Having the foregoing in mind, it is a primary object of the present invention to provide a multiphase welding transformer arranged within a unitary housing.

A further object of the present invention is to provide in a welding transformer the combination of a plurality of individual transformer cores and a rectifier for rectifying the output current from the several transformer cores, all housed within a single frame.

Another object of the present invention is the provision of a combination of a welding transformer and a rectifier arrangement integral therewith maintained within a housing, and so arranged that the rectifier is protected from becoming too hot in operation.

Still another object of the present invention is the provision of a welding transformer consisting of a plurality of primary and secondary windings on a transformer core, with a single control coil arranged to regulate the leakage reactance of all of the phases of the transformer.

A still further object of the present invention is the provision of a welding transformer in which the load current is availed of for varying the leakage reactance within the transformer, thereby materially extending the range of the transformer.

These and other objectes and advantages of this invention will become more apparent upon reference to the following specification taken in connection with the accompanying drawings, wherein:

Figure 1 is a perspective view of a transformer constructed according to the present invention;

Figure 2 is a perspective view of the transformer, with the outer casing removed to show the arrangement therein of the transformer cores and the other circuit elements associated with the transformer;

Figure 4 is a wiring diagram showing one set of connections that can be employed in connection with the transformer;

Figure 5 is a more or less diagrammatic view showing an arrangement that can be made of a single phase of the transformer according to this invention;

Figure 6 is a diagrammatic view similar to Figure 5 but showing the use of a feedback coil in connection with the leakage path of the transformer;

Figure 7 is a diagrammatic view showing how three transformer units, according to Figure 6, can be interconnected to provide a three-phase welding transformer;

Figure 12:
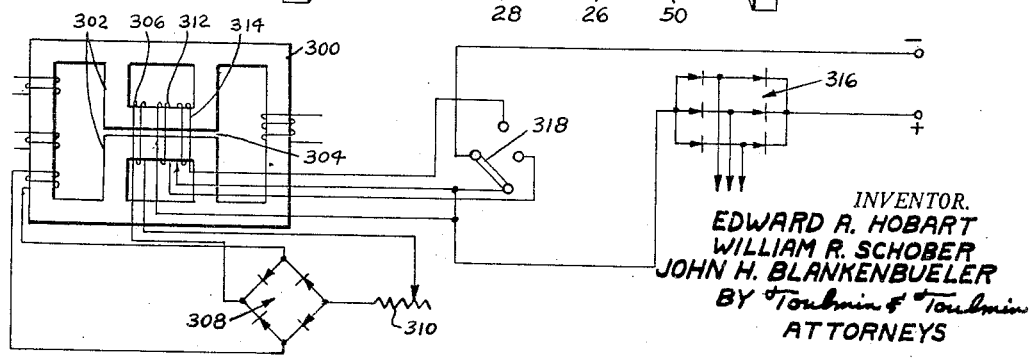
Figure 11:
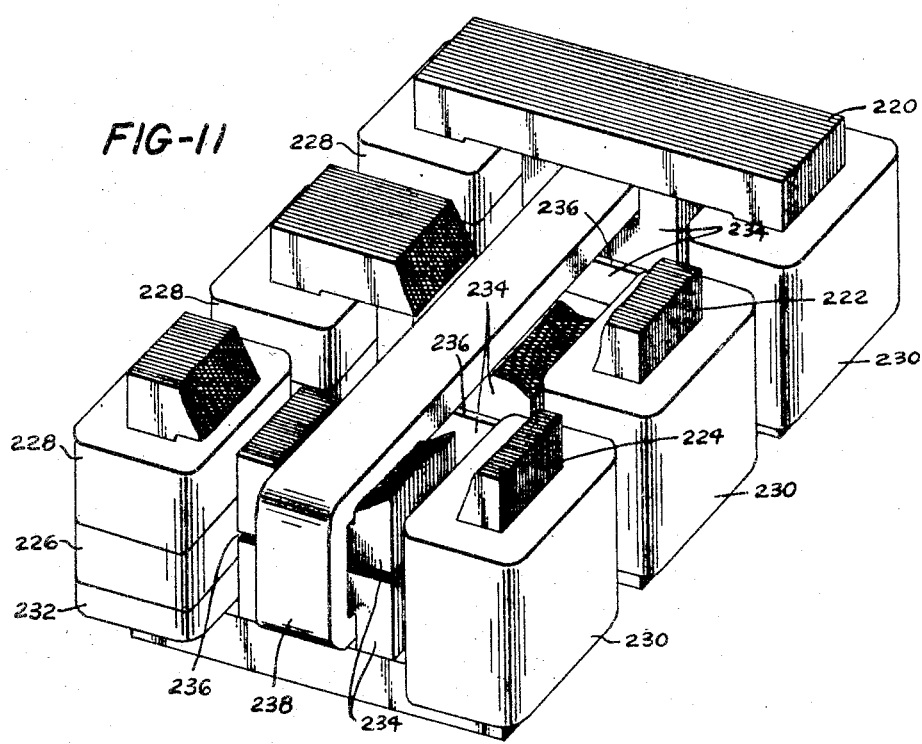

Figure 11 is a perspective view partly broken away showing the arrangement of a single control coil with three single phase transformer cores so that the single coil controls the saturation of the leakage paths of all of the transformers; and Figure 12 is a diagrammatic view showing a single phase transformer core having leakage path members according to this invention, with both positive and negative feedback windings associated with the leakage path members in addition to the control windings.

Figure 3:
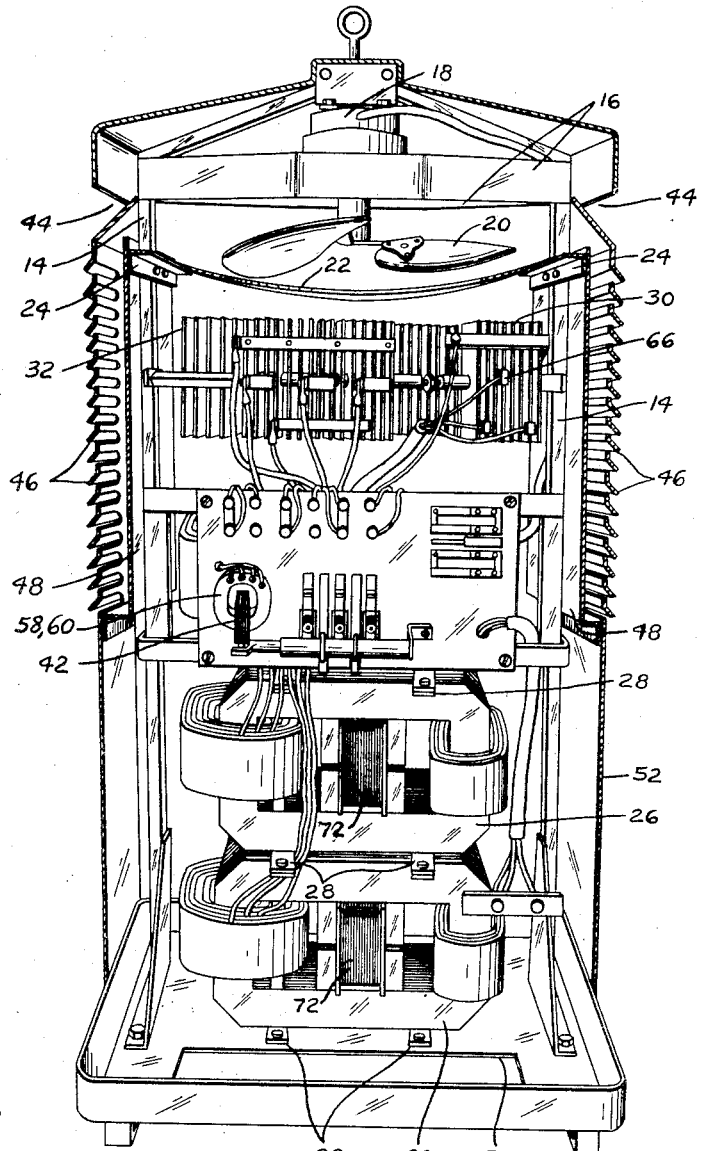
Figure 3 is a vertical sectional view of the transformer drawn in perspective showing the appearance of the transformer from the rear.

Referring to the drawings somewhat in more detail, Figures 1, 2 and 3 show a preferred structural arrangement of the transformer of the present invention wherein a frame is provided consisting of a base 10 having supporting leg means 12 with side frame members 14 upstanding from base member 10. Side frame members 14 are interconnected at their upper ends by the bars or straps 16 which also provide support for a fan motor 18 that drives a fan 20 which blows air downwardly through a central aperture in a baffle plate 22 resting on the angles 24 which are secured to the side frame members 14.

Arranged in vertically stacked relation between the side frame members 14 are a plurality of transformer cores 26 which may be provided with straps 28 for the purpose of bolting the lowermost one of the cores to the base member 10, and the upper ones of the cores to each other. Above the stacked transformer cores, and beneath baffle plate 22, are arranged rectifier means 30 and 32.

On the front of the transformer is a step switch arrangement 34, by means of which the number of turns in the transformer secondary coils can be changed together with a detachable rheostat means 36, by means of which the saturation of the leakage paths of the transformer cores can be adjusted.

The wires leading to the welding electrode and the work are connected with the terminals 38 located in a recess in the bottom of the front wall of the transformer housing, while the power lines supplying electrical energy to the primaries of the transformer are connected to the transformer at the rear thereof.

Start and stop buttons are located at 40 in the front wall of the transformer housing, and these buttons control a switch 42 carried on a panel located at the back of the transformer, as will be seen in Figure 3.

Inasmuch as cooling of the transformer cores and windings and rectifiers is extremely important, means are provided for insuring an adequate supply of air to the fan 20 in the form of openings 44 in the opposite sides of the transformer housing together with the louver openings 46 in the side walls of the transformer housing, and which louver openings are associated with the vertical baffle members 48 which direct the air entering through the louver openings upwardly to the inlet side of fan 20. The air blown by fan 20 passes over the rectifiers and transformer cores and exits through openings 50 provided in base member 10.

As will be seen in Figures 1 and 3, the transformer housing 52 is attached to base member 10 and extends upwardly therefrom and completely encloses the transformer units, the rectifiers, the control switch, and the fan and motor.

Each of the transformer cores 26 may be arranged with primary and secondary control windings, according to any of the arrangements illustrated in our co-pending application, Serial No. 400,038, referred to above. To provide for three-phase operation of the transformer the windings of the individual transformers can be interconnected, as illustrated in Figure 4.

In Figure 4 the power lines are indicated at L1, L2 and L3, and these lines lead through the blades 54 of the switch 42 and through the primary windings 56 of the three cores which may be connected in delta. Each primary is preferably provided with two taps so that the transformer can be operated on either of the two conventional three-phase industrial voltages, namely, 220 volt or 440 volt. The start button 40a controls a coil 58 which pulls the switch 42 closed to close the blades 54 thereof, and a second coil 60 in series with the normally closed stop button 40b is provided for holding the switch closed. The energizing circuit for coil 60 preferably includes the blade 62 of an overload relay and a blade 64 of a thermostatic relay, whose temperature sensitive element 66 is located between the plates of one of the rectifiers 30 or 32, thereby prevening overheating of the rectifiers.

Each of the transformer units comprises a pair of tapped secondary windings 68 and 70 connected in series, and between the secondary winding 70 of each unit and the primary winding 56 are the leakage paths, as disclosed in our prior application, the saturation of which is under the control of the control coils 72, of which there is one or more associated with each transformer unit and with all thereof connected in series. The serially connected control coils 72 are connected at one side to one corner of a rectifier bridge 74 and at their other side to one end of adjustable rheostat 36, the other end of which is connected to the opposite corner of rectifier bridge 74. A discharge resistor 76 is connected in parallel with the control windings 72. Rectifier bridge 74 is supplied by a tertiary winding 73 which is associated with one of the three transformer units, preferably closely coupled with the primary of the unit so as to be substantially unaffected by the degree of saturation of the leakage paths of the transformer core.

The secondary windings of the three transformer units, as shown in Figure 4, are connected in delta and connections are taken from the corner of the delta connected secondary windings to a full wave rectifier bridge 80 which has its opposite terminals connected with the load terminals 38.

In operation of the three-phase transformer, described in connection with Figures 1 through 4, when the primary of the transformer is energized a direct current will be supplied to terminals 38 and a coarse adjustment of the load current can be initially set by selecting the proper taps on the secondary windings.

A fine adjustment of the load current is obtained by controlling the current through the control coil 72 by setting the rheostat 36. Both the degree of saturation of the leakage path and the magnitude of the load current increase with an increase in control current.

During operation of the transformer the fan 20 maintains the transformer units and the rectifiers, particularly the latter, within proper operating temperature limits to prevent damage thereto, and the load of the transformer is distributed over the three supply phases, thereby providing for a balanced loading of the supply circuits.

The described arrangement does not require a separate reactor, but the entire transformer and the controls therefor are constructed as an integral unit, thus making it more compact and efficient than previous welding transformer arrangements.

The arrangement of the control coils of the three separate adjustable leakage reactance transformers provides for cancellation of all voltages that may be induced in the control coils, thereby making it a simple matter to control the supply of current to the control coils.

In Figure 5 there is shown a core arrangement suitable for use as one of the individual transformer units of a three-phase transformer according to this invention. In Figure 5 a core 90 has wound on one leg thereof a primary 92, a secondary 94, and an additional secondary in the form of a tertiary winding 96. An additional secondary winding is provided on the other leg of the transformer at 98. Leakage path members 100 are positioned on the inside of top and bottom members of the transformer core in back to back relation, with the air gap 102 therebetween and with a direct current control coil 104 wound about the two members. Current control coil 104 is supplied through a rectifier and rheostat from tertiary winding 96. A feed back coil 105 can be arranged coaxially with coil 104 to be supplied by the rectified output of the welder as will be described more in detail subsequently.

A fixed leakage path 106 is located adjacent the leg of the transformer on which the primary winding is located, and secondary winding 94 passes about this fixed leakage path member. Air gaps 108, at the ends of said leakage path member, are provided and are somewhat longer than air gap 102.

In the operation of the Figure 5 arrangement the primary is excited by line voltage, and at no load there is close coupling between the primary and the secondaries 94 and 98, which are connected in series and thereby providing for the desired striking voltage at the arc.

When the current through control coil 104 is zero, the imposing of a load on the secondary of the transformer will cause an increasing percentage of leakage flux to be diverted along the leakage paths, thus providing for a drooping voltage characteristic at the secondary terminals to provide for a stable arc.

When the current in control coil 104 is increased, thus obtaining a certain degree of saturation of the leakage paths, a higher magnetomotive force is required by the leakage iron to produce an amount of leakage flux corresponding to the leakage flux when the control is de-energized. Under these conditions the output current is increased.

It will be noted that substantially no alternating flux links the control coil 104, and that in a three-phase transformer the control coils 104 would be connected in series and whatever small voltages might be induced therein would be cancelled out. The effect of coil 104 can be modified by coil 105 which may be energized by the rectified load current thus providing for a "feedbody."

In Figure 6 there is shown a core 110 similar to the transformer core of Figure 5, with the exception of the fixed leakage path member and with the addition of a feedback winding 112 wound coaxially with control coil 114 about the leakage path members 116. In Figure 6 the primary coil is at 118, the secondary coils at 120, 122, and the tertiary winding at 124 is provided for supplying control coil 114.

A three-phase transformer employing the core arrangement of Figure 6 is diagrammatically illustrated in Figure 7. In Figure 7 the power lines L1, L2 and L3 are connected to the primary coils 118 arranged in delta, while the secondary coils are also arranged in delta with a full wave load rectifier 126 connecting the secondary delta with the load terminals 128. The feedback coils 112, there being one of these on each individual transformer core, are connected in series between load rectifier 126 and one of the terminals 128 so that load current flows through the feedback coils.

The control coils 114 are connected with tertiary winding 124, of which there is one only on one of the individual transformer cores, by way of the rheostat 130 and rectifier bridge 132.

By way of example of the manner in which the feedback windings 112 operate to increase the output of the welder for a given ratio of turns between the two portions of the secondary windings, it may be assumed that the control coils 114 each comprise 200 turns. By adjusting rheostat 130 to provide for 0.5 ampere flow through the control coils, each thereof sets up a direct magnetomotive force of 100 ampere turns, thus causing a flow of direct circulating flux in the leakage paths.

This degree of flux of the leakage paths, for example, sets up an output current at the terminals 128, of 100 amperes. Assuming that each feedback winding 112 consists of 5 turns, it will be evident that the 100 ampere output current will set up a magnetomotive force of 500 ampere turns for each feedback coil which adds to the 100 ampere turns of the associated control coil, thus giving a total of 600 ampere turns impressed on the leakage path members. This increases the degree of saturation of the leakage paths, thereby reducing the alternating flux in the leakage paths and increasing the output current to, for example, 120 amperes. This increase in output current results in a further increase of a direct magnetomotive force impressed on the leakage path members, and the output current will eventually stabilize at, say 130 amperes.

Assuming further, that rheostat 130 is adjusted to give the control current of 10 amperes, the magnetomotive force impressed by the control coils on each leakage path circuit is then 2000 ampere turns, tending to give an output current for the transformer of 180 amperes. This 180 amperes passing through the feedback windings 112 sets up an additional magnetomotive force of 900 ampere turns, which, in turn, causes increase in the output current which will stabilize at some increased magnitude, say, 230 amperes.

It will be apparent from the foregoing brief quantitative example that the use of the feedback windings, in connection with the transformer, will provide for a current range of from 130 to 230 amperes, whereas the identical transformer arrangement without the feedback windings would have a current range of from 100 to 180 amperes.

It will also be evident the feedback coils could be reversed so that their magnetomotive force would be in opposition to the magnetomotive forces of the control coils, whereby the minimum current obtainable from the welder arrangements would be decreased. For example, with a control current of 0.5 ampere the output current of the welder would be 100 amperes, as described above. If this 100 amperes were to be passed through one turn feedback windings, arranged in opposition to the control coils, 100 ampere turns would be detracted from the control field resulting in a net magnetomotive force of zero in the direct control field, whereupon the transformer output current would decrease to, say, 80 amperes. This would cause some change in the feedback field and the output current would eventually stabilize at, say, 85 amperes.

It will still further be evident that feedback windings of both polarities could be provided by utilizing first the negative feedback windings to reduce the current range of the welder, and then using the positive feedback windings to increase the current range of the welder; the total current range of the welders increasing from 100–180 amperes to 85–230 amperes.

An arrangement in which both positive and negative feedback coils, as shown in Figure 12, provide the transformer core 300 with the leakage path members 302 spaced by an air gap 304 according to this invention. The control coil 306 is supplied through rectifier bridge 308, with the current being controlled by rheostat 310.

Wound co-axially with coil 306 is the additive feedback coil 312 and the subtractive feedback coil 314. The feedback coils are adapted for being connected selectively into the load side of the load rectifier 316 by means of the switch 318. It will be apparent that switch 318 can be adjusted to include the subtractive feedback coil 314 in the circuit, to exclude both feedback coils, or to include the additive feedback coil 312 in the circuit.

It will be understood that the specific figures utilized above are merely exemplary and do not necessarily correspond to actual values that would be encountered in any welder arrangement.

It will also be evident that the feedback principle has been described in connection with a transformer, but that this same principle could be utilized in a reactor according to the present invention constructed separately from the transformer.

Figure 8:
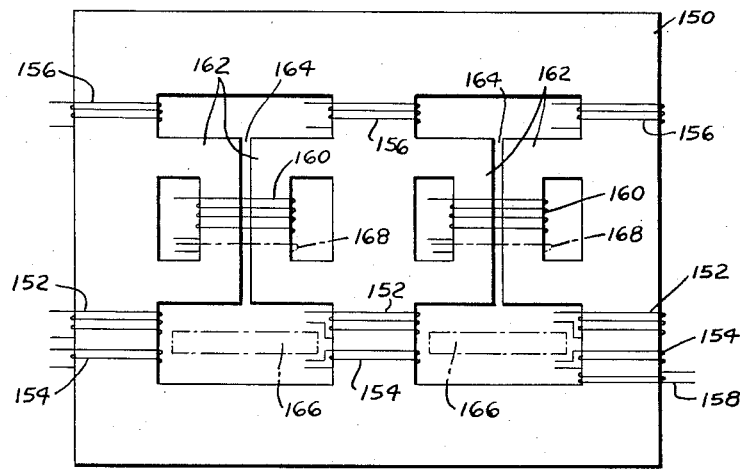
Figure 8 is a more or less diagrammatic view showing a three-phase transformer core with winding thereon.

The transformer arrangement described above has been characterized in the transformers being wound in the form of single phase units, but the principles of the present invention are likewise adaptable to three-phase transformers wound on a single core, as illustrated in Figure 8.

In Figure 8 transformer core 150 has three legs with a primary winding 154 on each thereof, and with each leg also having the serially connected secondary windings 152 and 156, and with one leg having the additional secondary in the form of tertiary winding 158 which supplies the control coils 160 wound about the leakage path members 162 which are spaced by the air gaps 164.

Fixed leakage path members 166 may be provided in association with the secondaries 152 if desired. The leakage path members may also be provided with one or more feedback windings 168 of either one or both polarities for increasing the range of the transformer, as described above.

Figure 9:
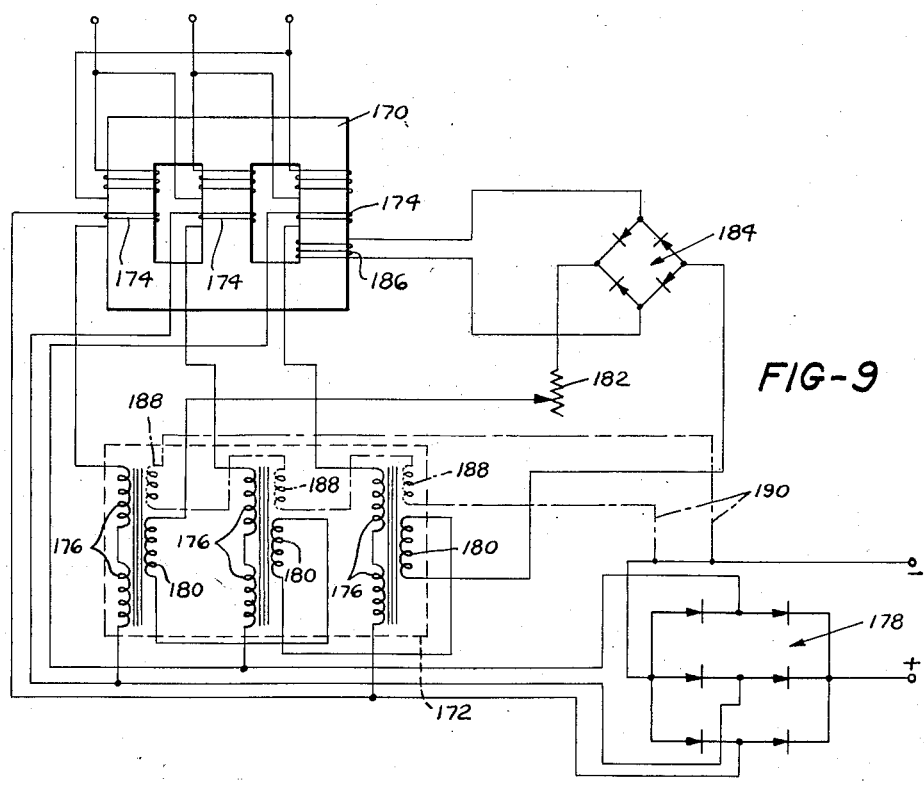
Figure 9 shows a combination of a three-phase transformer with a separate reactor.

Figure 9 illustrates the combination of a three-phase stepdown transformer 170, with a separate reactor 172 constructed according to the present invention with the center leg of a three-legged core having air gaps therein.

In Figure 9 the secondary windings 174 are connected in delta together with the reactor coils 176, and a load rectifier 178 is connected with the corners of the said delta. The reactor comprises the control coils 180 supplied through a rheostat 182 and rectifier bridge 184 by the tertiary winding 186 associated with one of the phases of transformer 170.

The center, or controlled leg of the reactor could be provided with one or more feedback windings 188 of the same or opposite polarities connected into one of the output leads from load rectifier 178 as by the wires 190 to increase the total range of the combination as described above.

Figure 10:
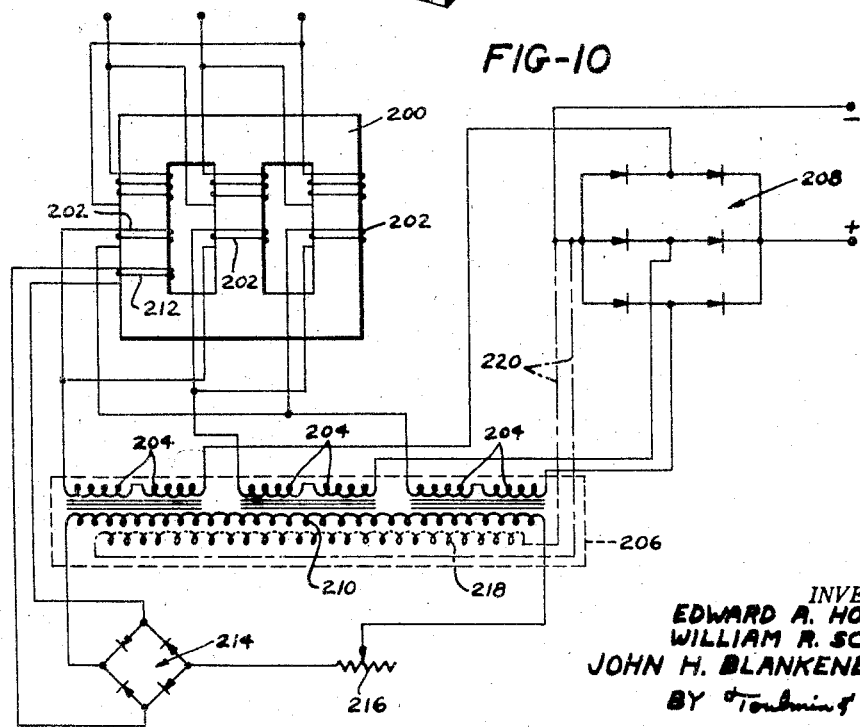
Figure 10 shows the combination of a three-phase transformer with a separate reactor wherein a single control coil controls the reactance of all three phases of the reactor.

Figure 10 shows a circuit arrangement similar to Figure 9 wherein a stepdown transformer 200 has its secondary coils 202 connected in delta with the reactor coils 204 of the separate reactor 206 connected between the corners of the secondary delta and the load rectifier 208.

The Figure 10 arrangement is characterized by a single control coil 210 supplied from tertiary winding 212 of one of the phases of transformer 200 through rectifier bridge 214 and rheostat 216.

The reactor of Figure 10 may also be provided with one or more feedback coils 218 arranged co-axially with control coil 210 in either opposing or additive relation thereto, and adapted for being connected by wires 220 in the load circuit on the output side of load rectifier 208.

A typical transformer structure employing a single control coil for regulating all three phases simultaneously is illustrated in Figure 11.

In Figure 11 the three individual transformer cores are indicated at 220, 222 and 224. Each of the transformer cores has on one leg the primary 226 and the secondary 228, with the other leg of the transformer carrying the additional secondary windings 230 that is in series with winding 228.

One of the primary coils 226 has associated therewith the tertiary winding 232 for supplying the control coil.

Each transformer core includes the leakage path members 234 separated by an air gap 236. The transformer cores are arranged in alignment and a single control coil 238 passes about all of the leakage path members, and in this manner a single coil can be utilized to control the transformer output in place of individual control coils for each transformer unit.

The control coil 238 of the Figure 11 arrangement has no alternating voltages inducted therein, and this coil can be combined with co-axial feedback coils in either opposing or additive relation to increase the range of the transformer. The Figure 11 arrangement is also adapted for use as a reactor, and in which case the primary and tertiary windings would be removed therefrom and the secondary coils 228 and 230 would merely take the form of reactor coils connected in circuit with the transformer secondaries as illustrated in Figure 10.

The several arrangements illustrated have been delta connected, but it will be apparent that both the primaries and the secondaries of the transformer arrangements could be connected in any desired manner.

For example, two transformers could be used in a Y—Y connection and, while in this case there would be voltages induced in the control coils, the magnitude of the induced voltages would be quite low.

An open delta connection could also be employed utilizing only two transformers. In this case also there would be voltages induced in the control coils which would not cancel out, but the resulting circulating current could be of small or relatively insignificant magnitude.

In all cases, however, the characteristic feature is present of the leakage paths with the air gap therein with direct current control coils associated therewith disposed substantially out of the path of any alternating current fluxes, and with the arrangement being adapted for having the current range thereof substantially extended by the use of feedback windings, as described above.

It will be understood that this invention is susceptible to modification in order to adapt it to different usages and conditions, and, accordingly, it is desired to comprehend such modifications within this invention as may fall within the scope of the appended claims.

We claim:

1. In a welding transformer; at least two transformer core means each having primary and secondary windings thereon, leakage path means associated with the secondary windings of said transformer, each leakage path means including an air gap, control coil means for varying the degree of saturation of said leakage path means and located so that substantially none of the alternating flux of the main transformer core passes therethrough, means for supplying direct current to said control coil means, and rectifier means connected with the secondary windings for converting the output current of said transformers to direct current.

2. In a welding transformer; a plurality of transformer cores having primary and secondary windings thereon, reactance means associated with the secondary sides of said transformers, said reactance means comprising a leakage path means including air gap means, direct current control coil means associated with said leakage path means energizable for varying the degree of saturation thereof thereby to vary the amount of secondary leakage reactance for each transformer thereby to control the volt-ampere characteristic curve thereof, and rectifier means connected with the secondary windings of said transformers for converting the alternating current output thereof into direct current.

3. In a welding transformer; a plurality of transformer cores each having primary and secondary windings thereon, reactance means associated with said secondary windings, said reactance means comprising magnetic leakage path means each having an air gap therein, direct current control coil means associated with said leakage path means energizable for varying the degree of saturation thereof, rectifier means connected with the secondary windings of the transformers for converting the alternating current output thereof to direct current, and a single winding on one of said transformer cores connected for supplying an energizing current for said control coil means.

4. In a welding transformer; a plurality of primary windings, a pair of spaced secondary windings for each primary winding, magnetic core means linking each primary with its secondary coils, leakage path means associated with said core means between the windings of each pair of secondary windings, direct current control coil means associated with said leakage path means energizable for varying the degree of saturation thereof, and therefore varying the volt-ampere characteristics of the transformer, and rectifier means connected with said secondary windings for converting the output current therefrom to direct current.

5. In a welding transformer; a plurality of primary windings connected in delta, a pair of spaced serially connected secondary windings for each said primary winding, magnetic core means linking each primary winding with its pertaining secondary windings, magnetic leakage path means including an air gap associated with said magnetic core means between each said pair of spaced secondary windings, direct current control coil means associated with said leakage path means energizable for varying the degree of magnetic saturation thereof thereby to vary the volt-ampere characteristics of the transformer, an additional secondary winding associated with one of said primary windings for supplying energy to said direct current control coil means, rectifier means and rheostat means connected between said additional secondary winding and said direct current control coil means, and full wave rectifier means connected in circuit with said secondary windings for converting the output current thereof to direct current.

6. In a welding transformer; three primary windings connected in delta, a pair of secondary windings connected in series associated with each said primary winding, magnetic core means linking each primary winding with the pertaining secondary winding, said secondary windings being spaced along the pertaining core means, magnetic leakage path means each including an air gap associated with each said core means between the spaced secondary windings thereon, direct current control coil means associated with said leakage path means energizable for varying the degree of magnetic saturation of said leakage path means, said direct current control coil means being disposed out of the path of the main magnetic flux of said core means and also out of the path of the leakage flux passing along said leakage path means, an additional secondary winding associated with one of said primary windings, rectifier means connecting said additional secondary winding with said control coil means to supply direct current thereto, and full wave rectifier means connected in circuit with said secondary windings for converting the output of said transformer to direct current.

7. In an alternating current inductance apparatus; a pair of spaced windings connected in series adapted for passing a load current therethrough, a magnetic core on which said windings are mounted, magnetic leg means associated with the core bypassing said windings and including air gap means, a direct current control coil associated with said leg means and disposed out of the path of the main flux of said core and also out of the path of flux in said leg means, means for supplying direct current to said control coil for varying the degree of saturation of said leg means, and another control coil associated with said leg means co-axial with said control coil and adjacent thereto adapted for being connected in series with said spaced windings so as also to carry the said load current.

8. In an alternating current inductance apparatus; a pair of spaced windings connected in series adapted for passing a load current therethrough, a magnetic core on which said windings are mounted, having side member magnetic leg means extending between said side member between said windings and including air gap means, a direct current control coil associated with said leg means and disposed out of the path of the main flux of said core and also out of the path of flux in said leg means, means for supplying direct current to said control coil for varying the degree of saturation of said leg means, and another control coil associated with said leg means co-axial with said control coil and adjacent thereto adapted for being connected in circuit with said spaced windings so as to also carry the said load current, said additional control coil being adapted for being connected so that the magneto-motive force developed thereby is additive to magnetomotive force of said first mentioned control coil.

9. In an alternating current inductance apparatus; a pair of spaced windings connected in series adapted for passing a load current therethrough, a magnetic core on which said windings are mounted, having side member magnetic leg means extending between said side member between said windings and including air gap means, a direct current control coil associated with said leg means and disposed out of the path of the main flux of said core and also out of the path of flux in said leg means, means for supplying direct current to said control coil for varying the degree of saturation of said leg means, and another control coil associated with said leg means co-axial with said control coil and adjacent thereto adapted for being connected in circuit with said spaced windings so as to be energized proportionally to said load current, said additional control coil being adapted for being connected so that the magneto-motive force developed thereby is subtractive to magnetomotive force of said first mentioned control coil.

10. In an alternating current inductance apparatus; a pair of spaced windings connected in series adapted for passing a load current therethrough, a magnetic core on which said windings are mounted, magnetic path means associated with the core between said windings and including air gap means, a direct current control coil associated with said magnetic path means and disposed out of the path of the main flux of said core and also out of the path of flux along said magnetic path means, means for supplying direct current to said control coil for varying the degree of saturation of said magnetic path means, another control coil associated with said magnetic path means co-axially with said control coil adapted for being connected in series with said spaced windings so as also to carry the said load current, said additional control coil comprising a first portion arranged so that its magnetomotive force is additive to the first mentioned control coil and a second portion arranged so that its magnetomotive force is subtractive to that of the first mentioned control coil, and switch means in circuit with said spaced serially connected windings for selectively connecting the said portions of said additional control coil in series therewith.

11. A stationary alternating current inductance apparatus comprising; a plurality of magnetic cores each comprising legs and interconnecting end members, at least one winding on each leg of each said core forming a pair of windings associated with each core, each said pair being connected in series, leakage path means extending between said end members having air gaps therein, magnetic members extending between said leakage path means on opposite sides of the air gaps therein, and a single control coil extending about all of said magnetic members whereby a supply of direct current control to said control coil will vary the saturation of said leakage path means.

12. A stationary alternating current inductance apparatus comprising; a plurality of magnetic cores each comprising legs and interconnecting end members, at least one winding on each leg of each said core forming a pair of windings associated with each core, each said pair being connected in series, rectifier means connected in series with said windings, leakage path means extending between said end members having air gaps therein, magnetic members extending between said leakage path means on opposite sides of the air gaps therein, and a single control coil extending about all of said magnetic members whereby a supply of direct current control to said control coil will vary the saturation of said leakage path means, there being additional control coil means also extending about all of said magnetic members adapted for being connected in the output side of said rectifier means for modifying the effect of said control coil means on said leakage path means.

13. In a three phase welding transformer; three individual transformer cores each having legs and end members connecting the legs, a primary winding and a secondary winding on one leg of each said core, a secondary winding on the other leg of said core connected in series with the other secondary winding on the same core, spaced leakage path members extending between the end members of each said core and each having an air gap therein, magnetic members extending between said leakage path means on opposite sides of the said air gap therein, said cores being arranged in alignment, and a single control coil means passing about all of said magnetic members whereby the supply of direct current to said control coil means will vary the degree of saturation of all said leakage path means and also whereas no alternating voltages are induced in said control coil means.

14. A welding transformer comprising; a plurality of primary windings, a secondary winding for each primary winding, magnetic core means linking each primary winding to the pertaining secondary winding, a full wave rectifier for converting the output of said secondary windings to direct current, and variable reactance means in the secondary circuit, said secondary windings being connected in delta and said reactance means being connected between the corners of said delta and said rectifier.

15. A welding transformer comprising; a plurality of primary windings, a secondary winding for each primary winding, magnetic core means linking each primary winding to the pertaining secondary winding, a full wave rectifier for converting the output of said secondary windings to direct current, and variable reactance means in the secondary circuit, said secondary windings being connected in delta and said reactance means being connected in the legs of said delta with the rectifier being connected to the corner of the delta.

16. A welding transformer comprising; a plurality of primary windings, a secondary winding for each primary winding, magnetic core means linking each primary winding to the pertaining secondary winding, a full wave rectifier for converting the output of said secondary windings to direct current, and variable reactance means in the secondary circuit, said secondary windings being connected in delta and said reactance means being connected between the corners of said delta and said rectifier, there being direct current control coil means energizable for varying the degree of saturation of the magnetic path of said reactance means.

17. A welding transformer comprising; a plurality of primary windings, a secondary winding for each primary winding, magnetic core means linking each primary winding to the pertaining secondary winding, a full wave rectifier for converting the output of said secondary windings to direct current, and reactance means in the secondary circuit, said secondary windings being connected in delta and said reactance means being connected between the corners of said delta and said rectifier, there being direct current control coil means energizable for varying the degree of saturation of the magnetic path of said reactance means, and feedback coil means co-axial with said control coil means adapted for being connected into the load side of said rectifier to modify the effect of said control coil means.

18. A welding transformer comprising; a plurality of primary windings, a secondary winding for each primary winding, magnetic core means linking each primary winding to the pertaining secondary winding, a full wave rectifier for converting the output of said secondary windings to direct current, and variable reactance means in the secondary circuit, said secondary windings being connected in delta and said reactance means being connected in the legs of said delta with the rectifier being connected to the corner of the delta, there being direct current control coil means energizable for varying the degree of saturation of the magnetic path of said reactance means.

19. A welding transformer comprising; a plurality of primary windings, a secondary winding for each primary winding, magnetic core means linking each primary winding to the pertaining secondary winding, a full wave rectifier for converting the output of said secondary windings to direct current, and reactance means in the secondary circuit, control coil means associated with the reactance means to vary the saturation thereof, said secondary windings being connected in delta and said reactance means being connected in the legs of said delta with the rectifier being connected to the corners of the delta, and feedback coil means co-axial with said control coil means adapted for being connected into the load side of said rectifier to modify the effect of said control coil means.

20. A stationary alternating induction apparatus comprising; a magnetic core having legs and end members, a pair of serially connected secondary windings one on each of said legs, a primary winding on one of said legs, leakage path means extending between said end members including air gap means, magnetic members extending between said leakage path means on the opposite sides of the air gaps therein, a direct current control coil surrounding said magnetic members thereby to vary the saturation of said leakage path means when energized, an additional secondary winding on the leg with said primary winding for supplying energy to said control coil, and a fixed leakage path means adjacent the leg on which said primary coil is mounted and about which the said secondary coil on the same leg is wound.

21. A stationary alternating induction apparatus comprising; a magnetic core comprising legs and interconnecting end members, a primary winding on one of said legs, serially connected secondary windings one on each said leg, leakage path means extending between said end members and each including an air gap, magnetic members extending between said leakage path means on opposite sides of said air gaps, a direct current control coil wound about said magnetic members for varying the saturation of said leakage path means when energized, an additional secondary winding on the leg with said primary winding for supplying energy to said control coil, a fixed leakage path member adjacent one leg and about which the said secondary winding on the said one leg is wound, and an additional direct current control coil surrounding said magnetic members adapted for being energized in proportion to the load current carried by said serially connected secondary windings for modifying the effect of said first-mentioned control coil.

References Cited in the file of this patent

UNITED STATES PATENTS

| | | |
|---|---|---|
| 1,843,176 | Seitz | Feb. 2, 1932 |
| 1,959,513 | Weyandt | May 22, 1934 |
| 2,023,876 | Dubrovin | Dec. 10, 1935 |
| 2,245,192 | Gugel | June 10, 1941 |
| 2,364,558 | Stocker | Dec. 5, 1944 |
| 2,412,989 | Kotterman | Dec. 24, 1946 |
| 2,588,155 | Ofverholm et al. | Mar. 4, 1952 |
| 2,591,582 | Monette | Apr. 1, 1952 |
| 2,609,531 | Kirchner | Sept. 2, 1952 |
| 2,679,024 | Oestreicher | May 18, 1954 |
| 2,752,529 | Croco et al. | June 26, 1956 |
| 2,765,119 | Marvin | Oct. 2, 1956 |
| 2,802,185 | Dewity | Aug. 6, 1957 |

FOREIGN PATENTS

| | | |
|---|---|---|
| 292,415 | Italy | Jan. 18, 1932 |
| 418,638 | Great Britain | Oct. 29, 1934 |